GEORGE W. HEATH.
Improvement in Seed Planter.
No. 125,568. Patented April 9, 1872.
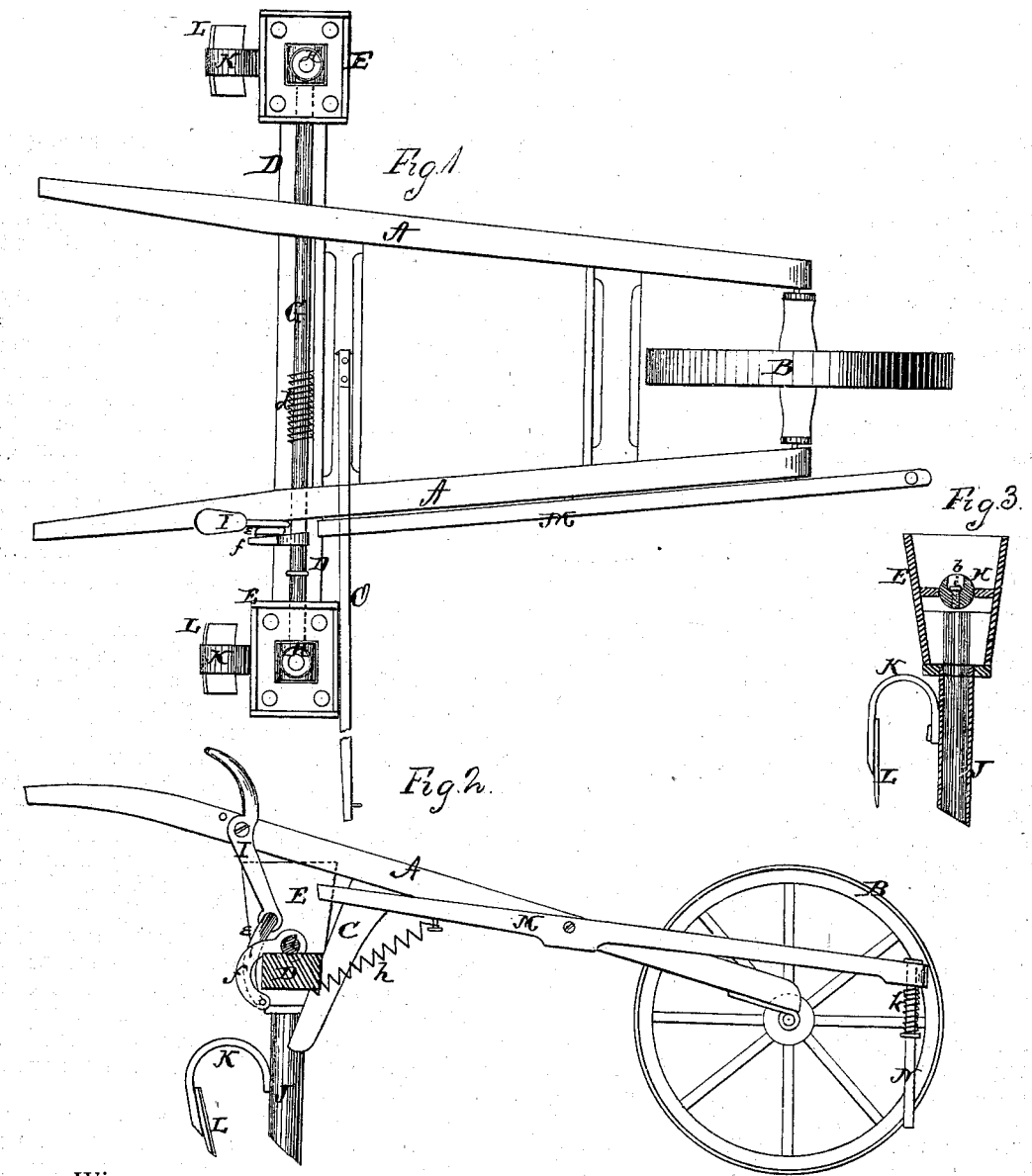
Witnesses:
Inventor
Geo. W. Heath.
per
Alexander Mason
Attorneys.

UNITED STATES PATENT OFFICE.

GEORGE W. HEATH, OF BURLINGTON, ASSIGNOR OF ONE-HALF HIS RIGHT TO ROBERT E. SPENCER, OF ULSTER, PENNSYLVANIA.

IMPROVEMENT IN WALKING PLANTERS.

Specification forming part of Letters Patent No. 125,568, dated April 9, 1872.

*To all whom it may concern:*

Be it known that I, GEORGE W. HEATH, of Burlington, in the county of Bedford and in the State of Pennsylvania, have invented certain new and useful Improvements in Seed-Planters; and do hereby declare that the following is a full, clear, and exact description thereof, reference being had to the accompanying drawing and to the letters of reference marked thereon making a part of this specification.

The nature of my invention consists in the construction and arrangement of a "seed-planter," as will be hereinafter more fully set forth.

In order to enable others skilled in the art to which my invention appertains to make and use the same, I will now proceed to describe its construction and operation, referring to the annexed drawing, in which—

Figure 1 is a plan view, and Fig. 2 a side elevation of my machine; in the latter view, one of the seed-boxes, with conductor and plow, being removed. Fig. 3 is a transverse vertical section of one of the seed-boxes and conductor, showing the plow attached to said conductor.

The frame of my machine is constructed somewhat in the shape of a wheelbarrow-frame, A A representing the side beams, which are suitably connected and form handles at their rear ends. These beams do not run parallel, but are closer together at their front than at their rear ends, and between their front ends is situated the wheel B. Legs C C are also attached to the beams A A, and to the rear sides of these legs is secured a horizontal bar, D, supporting at its ends the hoppers E E. On the upper side of the bar D runs a shaft, G, the ends of which pass into the hoppers E E, and are within the same provided with drums H, each drum being provided with a cavity, $b$, in its circumference, to receive a certain amount of seed, and drop the same into the ground. The amount of seed thus dropped is regulated by means of a set-screw, $i$, in the cavity $b$, which set-screw increases or diminishes the capacity of said cavity according as it is turned to the right or left. The shaft G, though capable of revolving, is held, by means of a spiral spring, $d$, in such a position that the cavities $b\ b$ in the drums H H will be on the upper sides thereof. The shaft is revolved sufficiently to turn the drums so as to bring the cavities downward and allow the seed in the same to drop out, by means of an angular lever, I, pivoted to one of the beams A, and its inner end connected, by a link, $e$, with a curved arm, $f$, attached to the shaft G. By this means the operator can at any time revolve the shaft and drums and drop the seed, the spring $d$ bringing the shaft and drums back into position as soon as the pressure is removed from the lever I. On the under side of each hopper E is attached a conductor, J, through which the seed dropping from the cavity in the drum H passes into the ground, the lower end of said conductor being inclined, as shown in Figs. 2 and 3. To this conductor is attached a curved shank, K, having a shovel, L attached to its rear end.

The operator moves this machine in the same manner as he would a wheelbarrow, raising the conductors and plows or shovels up from the ground until he comes to the place designed to drop the seed, when he lowers the rear end of the machine, allowing the conductors and plows to enter the ground, the conductors making holes in the ground, and the shovels making a small hill of earth behind. At this time, by pressing upon the lever I, the seed falls through said conductors into the holes made by them in the ground; and as the operator lets go of the lever the spring $d$ causes the drums to resume their original position, as above stated. The operator now raises the rear end of the machine to move forward, and as he thus moves, the hill of earth raised by the shovels falls forward, covering the seed.

On the side of the beam A is pivoted a bar, M, the rear end of which is connected, by a spring, $h$, with the bar D, and extends far enough toward the rear so that the lever I, when turned to operate the seed-drums H H, may strike the same on its under side and raise it. Through the front end of the bar M passes a pin or arm, N, which, when the rear end of the bar is raised, as just mentioned, is thrown into the ground, making a mark to indicate to the operator where he is to stop to drop seed the next time. This pin or arm N is provided with a spring, $k$, as shown in Fig. 2, so as to yield sufficiently to prevent any unnecessary jarring of the machine. On the rear cross-bar, connecting the beams A A of the frame, is pivoted a gauge, O, which may be thrown to either side, so as to mark or gauge the course of the machine.

In some cases I may provide this machine with an axle and wheels, to be drawn by a horse; or it may be moved by the operator himself.

Having thus fully described my invention, what I claim as new, and desire to secure by Letters Patent, is—

The marker-arm N and lever M with the springs $h$ and $k$, and arranged to be operated by the lever I, simultaneously with the seed-dropping mechanism, all substantially as described, and for the purposes set forth.

In testimony that I claim the foregoing I have hereunto set my hand this 5th day of January, 1872.

GEORGE W. HEATH.

Witnesses:
A. N. MARR,
EDM. F. BROWN.